United States Patent Office 3,618,322
Patented Nov. 9, 1971

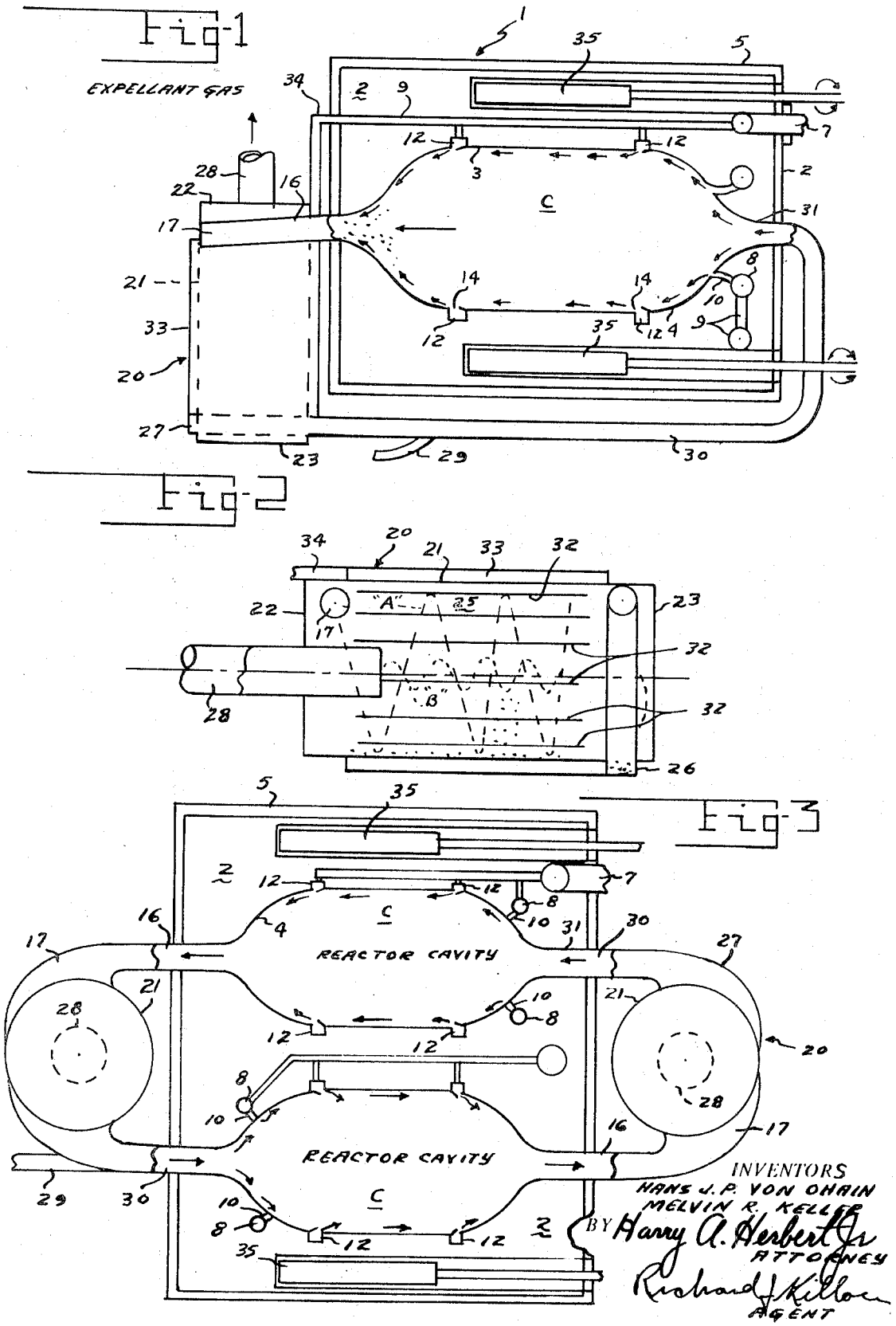

3,618,322
CAVITY REACTOR WITH EXTERNAL
SEPARATION
Hans J. P. von Ohain, Dayton, Ohio, and Melvin R.
 Keller, Pittsburgh, Pa., assignors to the United States
 of America as represented by the Secretary of the Air
 Force
Filed Jan. 13, 1970, Ser. No. 2,599
Int. Cl. G21d 5/00
U.S. Cl. 60—203                                  5 Claims

ABSTRACT OF THE DISCLOSURE

A cavity reactor propulsion system having a cylindrical cavity formed in a moderator body with a critical quantity of fissionable material in a powdered state admitted to the cavity and with gaseous hydrogen injected through small nozzles along the wall of the cavity with no appreciable centrifugal force field within the cavity. The hydrogen gas plus the entrained material are drawn to a vortex type separator wherein the fissionable material is removed from the hydrogen gas and returned to the reaction cavity with the clean hydrogen gas being discharged through a conduit which is adapted to be connected to a rocket nozzle.

BACKGROUND OF THE INVENTION

As long ago as in the 1950's atomic power reactors suitable for rocket propulsion had been proposed. In these reactors fissionable material in the form of a saturated metallic vapor or dry material in a finely divided state is admitted to a reactor cavity in a critical amount. An expellant gas, such as liquid hydrogen, is employed to regeneratively cool a moderator body in which the reactor cavity is formed and then admitted to the cavity under high pressure with a strong whirl component, for example as shown in the patent to Rom 3,270,496. The vortex flow in the cavity tends to continually centrifuge out the fissioning material and the heated expellant gas is discharged along the axis of the vortex flow core free from entrained reactive particles. When it is attempted to scale such a device into dimensions most suitable for applying the system to rocket propulsion in space, for example with a reactor of the order of 36 inches in diameter, the high loading of fissionable material in the reactor cavity would give rise to such high centrifugal force fields that contact of the fissionable material with the cavity walls cannot be prevented.

SUMMARY OF THE INVENTION

The present invention relates to means for avoiding the above-mentioned problem by not having any appreciable centrifugal force field present in the reactor cavity, or cavities, and separating heated expellant gas from the fissionable material in apparatus external from the reactor cavity and returning the reactive material to the cavity in a continuous recycling operation.

In accordance with the invention, a body of moderator material such as beryllium has a cylindrical cavity formed therein and lined with graphite. A critical quantity of fissionable material in the powdered state is admitted to the cavity with a stream of gaseous hydrogen. The fission reaction heats the hydrogen and gas plus entrained material is constantly withdrawn from the cavity and passed to a suitable vortex-type separating apparatus where clean heated expellant gas is continuously discharged. The separated fissionable material is returned to the reaction cavity. The rate of withdrawal and admission of reactive material to the reactor cavity is such that a critical quantity is always present in the cavity. Further, the cavity loading, i.e., ratio of mass of reactive material to mass of expellant gas is high, i.e., 100: 1, to keep system weight to a minimum.

The various features of the invention will become apparent by reference to the appended drawing, taken in conjunction with the written description thereof.

BRIEF DESCRIPTION OF THE DRAWING

FIG. 1 represents a schematic side elevation of a system employing a single reactor cavity;

FIG. 2 illustrates a schematic longitudinal sectional view of a typical centrifugal separator employed in the device of FIG. 1; and FIG. 3 is a view similar to FIG. 1 showing a system employing a pair of reactor cavities.

DETAILED DESCRIPTION OF THE INVENTION

With reference now to FIG. 1, the reference numeral 1 generally indicates a system in which reference numeral 2 indicates a rectangular moderator body preferably constructed from beryllium. The moderator body 2 in practice would generally be made ellipsoidal in shape and surrounded by a high strength pressure absorbing shell 5 made of high strength metal.

The moderator body 2 is provided with a symmetrical chamber or cavity 3 which forms the reactor cavity and additionally designated by the reference character C. The cavity C is generally cylindrical with quasi-hemispherical end portions 4. The reactor cavity C is preferably lined with graphite, the lining not being shown for simplicity.

The moderator body 2 is provided with regenerative cooling passages, not shown in detail but indicated generally at 9, which are connected seriatim to an inlet conduit 7 in turn adapted to be connected by means not shown to a tank of liquid hydrogen. After passing through the conventional regenerative cooling passages, the expellant gas flows into an annular feed passage 8 to which a large number of circumferentially disposed small nozzle passages 10 are connected in parallel and adapted to inject films of relatively cool hydrogen along the cavity walls at the upstream end. Suitable ring channels 12 also are connected to the regenerative cooling system to receive relatively cool hydrogen therefrom and adapted to inject expellant gas from a ring-type slot lip nozzle 14. The channels 12 are positioned downstream from the nozzles 10 and may be in any desired number more than the two channels shown. The hydrogen issuing from the ring slot nozzles 14 forms a cooling film over the cavity walls and mixes with the reactive material in the cavity to be heated thereby. In operation, nuclear material is constantly present in the chamber C in an amount exceeding the critical mass so that a fission reaction takes place. Hydrogen at high velocity enters the chamber C from nozzles 10 and 14 in an amount equal to the desired weight of expellant gas required in pounds per second. The heated expellant gas with entrained nuclear material proceeds downstream in the chamber C and exits via a discharge conduit 16, with external of the moderator body is preferably made of tungsten or similar heat resisting material, which cannot be employed within the reactor chamber because of its adverse effect on the nuclear fission process.

The discharge conduit 16 connects to the inlet 17 of a centrifugal or vortex type of particle separator generally indicated at 20 and also constructed of tungsten. The separator 20 has an outlet 27 connected to the particle return conduit 30, the end of which connects to the upstream end of cavity C at inlet 31.

Reactive material may be supplied to the apparatus through return conduit 30 at input 29 from a supply, not shown. Any conventional control means for externally moderated reactors may be provided, for example, such as control rods 35.

The centrifugal separator 20 of FIG. 1, as seen in FIG. 2, includes an elongated cylindrical housing 21 closed at its respective ends by closures 22 and 23 and forming a vane-free natural vortex chamber generally indicated at 25. The inlet 17 enters the housing 21 adjacent the closure 22 and is arranged so that the entrance flow is tangential as well as slightly inclined downstream toward the opposite closure. Gaseous hydrogen under high pressure mixed with entrained powdered nuclear material enters the vortex chamber 25 with a rotational component and immediately a natural vortex flow is formed with the flow spiraling downstream in the chamber 25 in a primary flow as indicated in dotted lines by the reference character A. Near the closure wall 23 the primary flow turns radially inward to join a vortex core indicated in dotted lines by reference character B. The vortex flow follows the law that the product of the peripheral velocity C, at any radius times the radius in the same length units must be constant or $r \times C_u =$ a constant. This means that near the vortex chamber wall the velocity will be relatively low and the static pressure high while at the axis of rotation where $r$ is equal to zero the velocity is infinite and the pressure an absolute vacuum. Actually, the core velocity and subatmospheric pressure are limited so that the central portion of the vortex core rotates as if it were a solid rod. Because of the high tangential velocity of entry of the contaminated gas stream into the vortex chamber 25, the larger particles of the reactive material due to centrifugal force are thrown out against the cylindrical walls of the chamber and drift downstream to collect in an annular groove 26 extending radially outward from the walls and forming a cavity connected to the particle discharge conduit 27 which in turn connects to the return conduit 30 which returns the reactive material in the form of dust to inlet 31 and chamber C of FIG. 1.

Additional hydrogen gas is admitted to the separator tangentially through slots 32 from manifold 33 connected to passages 9 by means of conduit 34 to avoid adhering of fuel particles at the wall of the centrifugal separator 20 and also to reduce the wall temperature.

In the event that very fine particles of reactive material are not initially separated, they will be turned with the primary flow A into the vortex core flow B and because of the intense centrifugal force field in the core will be centrifuged out of the core eventually collecting along the cylindrical wall for mixing with the coarser particles and eventual removal therewith. The vortex core flow moves upstream in the vortex chamber 25 in a known manner and the clean expellant gas enters the discharge conduit 28 where it can ultimately be expanded in a rocket nozzle (not shown) adapted to be connected thereto. For improved particle separation and reduced pressure drop, the particle separator may be of the improved type disclosed in the pending U.S. patent application, Ser. No. 591,060, filed Oct. 28, 1966 in the names of Hans J. P. von Ohain and Roscoe H. Mills.

FIG. 3 illustrates the manner in which a pair of reactor cavities C can be arranged for operation in series. All of the parts of the system of FIG. 3 are identical to the system of FIG. 1 and corresponding parts identified with the same reference numerals as in FIGS. 1 and 2. In FIG. 3 the pair of chambers 3 forming the respective reactor cavities C are physically positioned in parallel relation in the beryllium moderator body 2 but the cavity inlets 31 and the outlets 16 are reversed in position in one cavity with respect to the other cavity. The cavities are then connected in series employing a pair of centrifugal separators 20 connected into the series circuit. The operation of the device is identical to that of FIG. 1 except that the sum of the outputs of expellant gas from the respective discharge conduits 28 is double that of FIG. 1 but the nuclear particle loading in each chamber of FIG. 3 is the same as in the device of FIG. 1.

We claim:

1. A cavity reactor system for use in a rocket propulsion system, comprising: a moderator body member having a cylindrical cavity with reduced cross section and portions; a critical amount of finely divided fissionable material within said cavity; a vortex separating apparatus located outside said moderator body and connected between the reduced end portion at one end of said cavity and the reduced end portion at the other end of said cavity; means for directing a high velocity substantially longitudinal flow of gaseous hydrogen through said fissionable material within the cavity for heating the hydrogen gas and through the vortex separating apparatus for removing entrained reactive particles in the gaseous medium which particles are returned to said cavity and an axially positioned discharge conduit connected to said vortex separating apparatus.

2. The device as recited in claim 1 wherein said hydrogen gas is supplied to said cavity through a plurality of circumferentially disposed nozzle means for directing said gaseous hydrogen along the walls of the cavity.

3. The device as recited in claim 1 wherein said moderator body has a second cylindrical cavity with reduced cross section end portions; said vortex separating apparatus being connected to one of the reduced end portions of the second cavity; a second vortex separating apparatus connected between the other reduced end portion of the second cavity and the other reduced end portion of the first cavity; means for directing a high velocity substantially longitudinal flow of gaseous hydrogen through the second cavity in a direction to aid the flow in the first cavity.

4. The device as recited in claim 3 wherein said hydrogen gas is supplied to said first and said second cavities through a plurality of circumferentially disposed nozzle means for directing said gaseous hydrogen along the walls of the cavities.

5. The device as recited in claim 4 including means for providing a tangential flow of hydrogen gas along the walls of said vortex separating apparatus.

References Cited

UNITED STATES PATENTS

| | | | |
|---|---|---|---|
| 3,545,735 | 12/1970 | Wolf | 55—459 X |
| 3,270,496 | 9/1966 | Rom | 60—203 |
| 3,250,683 | 5/1966 | Gustavson et al. | 176—39 |
| 3,202,581 | 8/1965 | Barr et al. | 176—46 |
| 3,287,910 | 11/1966 | Silverstein | 60—203 |
| 3,350,884 | 11/1967 | Colombani et al. | 60—203 |

MARK NEWMAN, Primary Examiner

R. B. ROTHMAN, Assistant Examiner

U.S. Cl. X.R.

55—261, 449, 459; 176—39